July 2, 1968    W. B. FINDLEY, JR., ET AL    3,391,322

CONSTANT POWER REGULATOR WITH VARIABLE VOLTAGE BOOST

Filed Nov. 30, 1965

INVENTORS
MICHAEL MONACO
WILLIAM B. FINDLEY, JR.

BY *Sughrue, Rothwell, Mion, Zinn, & Macpeak*

ATTORNEYS.

United States Patent Office 3,391,322
Patented July 2, 1968

3,391,322
CONSTANT POWER REGULATOR WITH
VARIABLE VOLTAGE BOOST
William B. Findley, Jr., Edgewood, Md., and Michael Monaco, Los Angeles, Calif., assignors, by mesne assignments, to the United States of America as represented by the United States Atomic Energy Commission
Filed Nov. 30, 1965, Ser. No. 510,545
6 Claims. (Cl. 321—2)

ABSTRACT OF THE DISCLOSURE

This constant power regulator is primarily applicable to supplying a constant load from a thermoelectric generator having a decaying power characteristic, where it is desirable to maintain current flow from the generator as high as possible. The regulator senses the power output of the generator. For initial high power, characterized by high current and low voltage, the regulator provides a voltage boost. As the generator power decreases, current output decreases and voltage increases, and the regulator accordingly decreases the amount of voltage boost.

---

Figure 1:
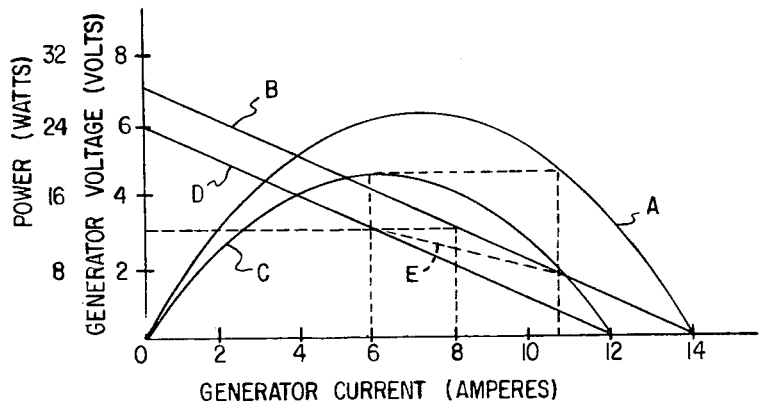

This invention relates in general to a power regulator for an electric source-load system, and more particularly to a novel regulator which both maintains the output power at a constant level throughout the useful life of a decaying power source and maintains a constant voltage drop across the load. The invention described herein was made in the course of or under a contract with the United States Atomic Energy Commission and is particularly, although by no means exclusively adapted to be used with a radioisotope fueled thermoelectric generator.

Thermoelectric generators function to convert heat directly into electricity, and have found increasing use in recent years in combination with heat sources using radioactive isotopes. Since a number of such isotopes that are now commercially available at relatively low cost have half-lives in excess of ten or twenty years, this type of a self contained electric generator package will function reliably and without attendance over long periods of time. One of the many situations in which these generator packages are particularly attractive is as the power sources for navigation lights and beacons, such as are incorporated in sea-anchored buoys and which must operate dependably at all times and under the most adverse weather conditions. The actual generating or converting means employed in thermoelectric generators are thermocouples, and they are supplied with heat developed in the radioactive isotopes as the individual atoms of the latter decay or disintegrate, i.e. revert back to their radioactively neutral states. As the isotope mass gradually decays in this manner its heat producing capability correspondingly decreases, and the available electrical power output of the generator also decays in direct proportion to the temperature drop.

Due to the Peltier cooling effect exhibited by the thermocouples, their hot junctions operate at lower temperatures as the current through them is increased, and this low temperature operation is highly desirable in terms of less degradation of thermocouple elements and increased overall stability.

In virtually all practical applications the thermoelectric generators are used in conjunction with regulating devices which not only function to maintain the desired electrical operating characteristics at the load as the power outputs of the generators decay, but also provide power at the desired voltages, currents, wave forms, etc. The most common type of regulator employed in the thermoelectric systems of the prior art is a conventional controlled shunt regulator in which the output voltage is maintained constant over the useful life of the generator. A very serious drawback of constant voltage regulation as applied to thermoelectric generators resides in the fact that the load current remains relatively low at all times, and this results in the high thermocouple temperatures with the attendant degradation and instability effects mentioned above.

It is, therefore, a primary object of this invention to provide an electric regulator for a decaying power source which maintains a constant power output from the source throughout its useful life while providing a high initial load current and a constant voltage drop across the load.

It is a further object of this invention to provide such a regulator which operates by sensing the power output from the source and controlling a direct current boost regulator in accordance therewith, to thereby convert the proper amount of the source output current into a corresponding voltage at a higher potential in order to maintain a constant voltage drop across the load.

It is a further object of this invention to provide such a regulator which is particularly adapted to be used in combination with a radioisotope fueled thermoelectric generator, and which provides a high initial load current to thereby implement cooler operation of the thermocouple elements and thus prolong their life.

In a preferred embodiment of the invention the above objects are implemented by connecting a conventional Hall effect power sensor in series with the current output of a thermoelectric generator and across its voltage output. The signal produced by the Hall effect device is thus proportional to the power output of the generator, and this signal is amplified in an operational amplifier referenced to ground and applied to the base terminal of a transistor. The emitter-collector path of the transistor is connected across the generator output in series with the biasing resistor of a free-running, voltage controlled blocking oscillator. The inductive load of the oscillator serves as the primary winding of a saturable core transformer whose rectified secondary winding output is applied to the main generator load along with the remaining or unboosted portion of the generator output signal. In this manner, a high initial current is drawn from the generator at a reduced voltage level, and in order to provide a constant voltage drop across the load throughout the useful life of the generator, a portion of this current is converted to a boosted voltage by the oscillator-transformer combination. As the generator ages, its current output decreases and its voltage output, therefore, increases assuming a constant power level. As the voltage increases the transistor is rendered less and less conductive, to thereby decrease the voltage boost and permit more of the generator output to flow directly through the load.

Figure 2:
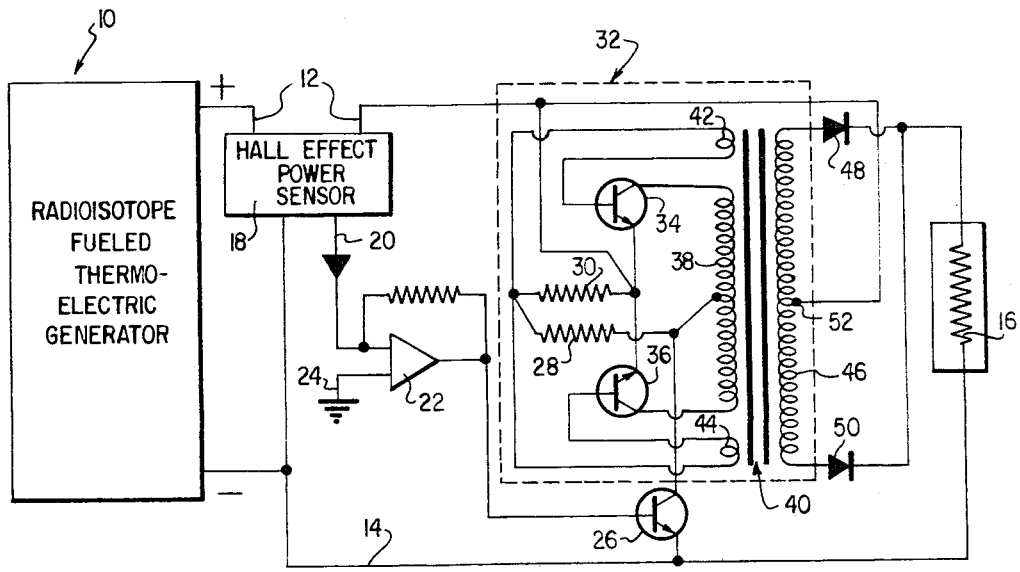

The above and further objects and advantages of the invention will be readily understood by those skilled in the art from a consideration of the following more detailed description thereof, taken in conjunction with the drawings, in which:

FIGURE 1 shows a coordinate plot of power versus current and voltage versus current curves for a typical thermoelectric generator fueled with a radioactive isotope both at the beginning of its life and at the end of its useful life, and FIGURE 2 shows a circuit diagram, partly in schematic form, of a preferred embodiment of the invention.

Referring now to FIGURE 1, curve A represents the power available from a radioisotope fueled thermoelectric generator at the beginning of its life as a function of current, while line B represents the generator voltage as a function of current. Line B is derived from curve A by dividing the power at each point by the corresponding current in accordance with the well known formula, power (watts) = voltage (volts) × current (amperes). Similarly, curve C represents the available generator power at the end of its useful life as a function of current and line D is the end of life voltage-current characteristics derived from curve C. In dealing with the power curves, it will be understood that they represent maximum available power-current points and the actual operating point for the generator may therefore be chosen at any coordinate location within the area bounded by the curves.

Looking at curve C, it can be seen that the peak power output of the generator at the end of its useful life occurs at approximately 6 amps., and, from line D, this corresponds to an output potential of 3 volts. If the constant voltage regulation scheme of the prior art is employed the initial generator current would therefore be approximately 8 amps., following along the dotted 3-volt line to line B and then down to the current abscissa. It is apparent from FIGURE 1 that this initial current value of 8 amps. is well under the maximum current available from the generator. If, however, constant power regulation is employed, as per the teachings of this invention, the initial current value now becomes approximately 10.8 amps., tracing along the dotted constant power line at approximately 16 watts to curve A and then down to the current abscissa again. In view of the advantages of higher currents because of their Peltier cooling effects in the thermocouple elements, a constant power regulating arrangement is clearly more desirable in this type of system, and the apparatus of this invention is intended to implement such a regulating scheme.

With constant power regulation, it may be seen from line B that the initial generator potential is just under 2 volts, and rises steadily to 3 volts along the dotted line E as the source material decays over its useful life. Since it is generally required that a constant voltage output be maintained across the load, as in the case of navigation beacons to provide a steady light intensity, an acceptable constant power regulator for a thermoelectric generator must also be capable of supplying a constant voltage to the load throughout the useful life of the generator.

A regulating circuit for fulfilling these objectives and constructed in accordance with the teachings of this invention is shown in FIGURE 2. A radioisotope fueled thermoelectric generator 10, which may be of the type disclosed in a commonly assigned co-pending application Ser. No. 474,547, of George S. Stivers et al., filed July 26, 1965, and entitled, Low Cost Radioisotope Thermoelectric Generator, supplies DC power with the polarities shown over lines 12 and 14 for ultimate consumption in a load 16. A Hall effect power sensor 18 is connected both in series with the current output of the generator line 12 and across the voltage output of the generator between lines 12 and 14 and provides an output signal over line 20 proportional to the power output of the generator 10. The power sensor 18 may be of any conventional type which provides an output signal proportional to a voltage-current product and a Hall effect device is shown by way of example only. One such Hall effect power sensor which could be employed in the circuit of this invention is manufactured by F. W. Bell, Inc., Columbus, Ohio (Model HM 3040). The power sensor output is applied to one of the input terminals of an operational amplifier 22, referenced to ground at 24, and the amplified output is fed to the base of an NPN transistor 26. The emitter-collector path of the latter is connected in series with a dropping resistor 28 and a biasing resistor 30 of a conventional blocking oscillator 32 across the generator output lines 12 and 14. The oscillator 32 includes a pair of NPN transistors 34, 36, a center tap return inductive load winding 38 of a saturable core transformer 40 and a pair of feedback windings 42, 44.

The oscillator 32 functions in a well known manner with transistors 34 and 36 alternately conducting to produce an AC output in winding 38 having a magnitude depending upon the potential across resistor 30, which is in turn a function of the conductivity of transistor 26. The oscillator output is transformed to a higher voltage level in the secondary winding 46 of the transformer 40, full wave rectified by diodes 48 and 50 and applied to the load 16 along with the portion of the direct generator output fed to the center tap 52 of the secondary winding.

In operation, with the initial generator current at a relatively high level, as seen in FIGURE 1, the generator voltage is at its lowest point and requires boosting in order to provide a potential drop across the load corresponding to the unboosted voltage at the end of the useful life of the generator. Under these conditions, the output signal from the Hall effect power sensor 18 is at a maximum level and transistor 26 is heavily conductive. A substantial portion of the generator current is therefore drawn through the oscillator 32 over the path including resistors 30 and 28 and is converted to a lower current, higher voltage signal by the oscillator-transformer combination. The parameters of the circuit components are chosen so that this signal, when added to the direct generator output coupled to center tap 52, provides the desired voltage drop across the load 16. If the generator power tends to increase, the power sensor signal over line 20 also increases to render transistor 26 more conductive. This in turn lowers the impedance of the oscillator path and therefore the net circuit impedance which raises the overall generator current level. This correspondingly decreases the generator voltage and restores the system to the proper power level. If, on the other hand, the power decreases, the power sensor signal decreases and causes transistor 26 to become less conductive. This has the effect of raising the net circuit impedance to lower the generator current and return the power output to the proper level. As the fuel source gradually decays the power sensor signal over line 20 decreases. This channels a greater amount of the unboosted generator signal directly through the load 16, until, at the end of the useful life of the generator, corresponding to curve C in FIGURE 1, transistor 26 is completely cut off, there is no voltage boost produced, and the load receives all of the generator signal at the direct, unboosted level.

It can thus be seen that this invention provides a novel constant power regulator, which, through the expedient of a voltage booster controlled in accordance with the sensed power output, maintains constant generator power and load voltage levels with a high initial load current. The latter is particularly desirable in radioisotope fueled thermoelectric generators since it greatly reduces the temperature of the thermocouple elements during the period of time when the excess temperature is not necessary to produce the required power, and thus prolongs their life, during the time when the fuel temperature is at its highest level.

While there has been shown and described a preferred embodiment of the invention, many minor changes and variations therein will be readily apparent to those skilled in the art. For example, the oscillator 32 may be of any convenient type which converts DC to AC, the amplifier 22 could provide a chopped signal to the transistor 26 to reduce circuit losses, etc. Such changes are to be interpreted, under the docrine of equivalence as being in the spirit and scope of the invention, which is limited only as defined in the following claims.

What is claimed is:

1. A regulating circuit for connection between a varying source of power and a load for maintaining a constant power output from the source and supplying a constant voltage to the load in such a manner as to maintain a high level of current flow from the source comprising:
    (a) means for sensing the power output of the source;
    (b) electrically adjustable impedance means so connected to said power sensing means that a change in power output results in a change in impedance; and
    (c) voltage varying means having an input connected to said adjustable impedance means and an output adapted to be connected to the load, said voltage varying means being controlled by said adjustable impedance means so that a decrease in sensed output power results in a decrease in output voltage.

2. A regulating circuit for connection between a decreasing source of power and a load for maintaining a constant power output from the source and supplying a constant voltage to the load in such a manner as to maintain a high level of current flow from the source, comprising:

(a) means for sensing the power output of said source;
(b) electrically adjustable impedance means connected across said load, said means being so connected to said power output measuring means that a decrease in power output from said source results in an increase in the impedance of said adjustable impedance means;
(c) voltage varying means having an input and an output, said output being connectable to the load, and said input being connected to said adjustable impedance means so that the voltage at said output is a function of the current flowing through said adjustable impedance means, increasing when the impedance decreases and decreasing when the impedance increases.

3. The regulating circuit of claim 1 wherein said adjustable impedance means comprises a transistor connected to said power sensor so as to become less conductive with a decrease in sensed power.

4. The regulating circuit of claim 1 wherein said voltage varying means comprises a DC-AC-DC converter.

5. A constant power regulator for a radioisotope fueled thermoelectric generator characterized by a decaying power-current curve as a function of time comprising:

(a) a DC-AC-DC voltage booster connectable between a load and the generator output and including:

(1) a free-running, push-pull blocking oscillator having a control resistor,
(2) a saturable core transformer whose primary winding is energized by the oscillator output, and
(3) a full wave rectifier connected between the transformer secondary winding and the load, (b) a power sensor connectable in series with the current output of the generator and in parallel with its voltage output,
(c) a transistor having its emitter-collector path connected in series with the control resistor across the generator output, and
(d) an operational amplifier responsive to the power sensor and having its output connected to the base of the transistor, whereby a high initial current is supplied by the generator at a low voltage which is boosted in such a manner that the potential drop across the load remains constant throughout the useful life of the generator, and wherein the voltage boost is gradually decreased to 0 as the radioisotope decays with time and the generator voltage rises.

6. A constant power regulator as defined in claim 5 wherein the power sensor is a Hall effect device.

References Cited
UNITED STATES PATENTS

| | | | |
|---|---|---|---|
| 2,991,410 | 7/1961 | Seike | 321—2 X |
| 2,996,655 | 8/1961 | Byles | 323—94 |
| 3,189,815 | 6/1965 | Barabutes et al. | 323—94 |
| 3,222,535 | 12/1965 | Engelhardt | 321—2 X |
| 3,293,530 | 12/1966 | Baude | 321—8 |

JOHN F. COUCH, *Primary Examiner.*

WARREN E. RAY, *Examiner.*

W. H. BEHA, JR., *Assistant Examiner.*